United States Patent [19]
Hayashi

[11] Patent Number: 5,331,480
[45] Date of Patent: Jul. 19, 1994

[54] DYNAMIC TRACKING REPRODUCTION APPARATUS

[75] Inventor: Yasuhiro Hayashi, Kanagawa, Japan

[73] Assignee: Kabushiki Kaisha Toshiba, Kawasaki, Japan

[21] Appl. No.: 870,471

[22] Filed: Apr. 17, 1992

[30] Foreign Application Priority Data

Apr. 19, 1991 [JP] Japan .................................. 3-88725

[51] Int. Cl.$^5$ .............................................. G11B 21/10
[52] U.S. Cl. .............................. 360/77.17; 360/77.16
[58] Field of Search ............... 360/77.16, 77.17, 77.01, 360/77.12, 77.13

[56] References Cited

U.S. PATENT DOCUMENTS

| | | | |
|---|---|---|---|
| 4,445,146 | 4/1984 | Sakamoto et al. | 360/77.17 |
| 4,642,707 | 2/1987 | Geiger et al. | 360/77.12 |
| 4,677,504 | 6/1987 | Yamazaki et al. | 360/77.16 |

FOREIGN PATENT DOCUMENTS 56-50329 11/1981 Japan .

Primary Examiner—Louis J. Casaregola
Attorney, Agent, or Firm—Foley & Lardner

[57] ABSTRACT

A dynamic tracking reproduction apparatus comprises an actuator for driving a magnetic head in a width direction of recording tracks formed on a recording and reproducing tape; error detector for detecting offsets of the magnetic head from a reference position in the width direction of the recording tracks as positional error signals on basis of signals read from the magnetic head; actuator driver for driving said actuator so that the magnetic head is directed to the reference position on the basis of the detected error signals; and a delay element for correcting time axis of the read signals so that the magnetic head can be located on the reference position on the basis of the detected error signals. Since the time axis fluctuations generated during dynamic tracking operation can be cancelled by the delay element, it is possible to generate reliable reproducing signals free from the time axis fluctuations.

2 Claims, 4 Drawing Sheets

DYNAMIC TRACKING REPRODUCTION APPARATUS

BACKGROUND OF THE INVENTION

The present invention relates to a dynamic tracking reproduction apparatus, and more specifically to a reproduction apparatus suitable for a video tape recorder for recording video signals in helical scanning fashion, a DAT (digital audio tape recorder), etc.

In a recording and reproduction apparatus of helical scanning type such that a recording tape is wound around the circumference of a rotating head to increase the relative speed between the tape and the head, the recording tracks on the tape are not necessarily formed in a straight line but in a S-shaped curve in general. The cause of this S-shaped curve is that the working precision of the cylinder is not sufficient or the tension of the tape around the cylinder is not uniform, and their results in deterioration of reproduced pictures. To overcome these problems recently in the field of video tape recorders, in particular, there has been developed a reproduction apparatus in which a dynamic tracking mechanism for monitoring the positional relationship between the magnetic heads and the recording tracks to correct the offset between both during reproducing operation is incorporated for providing a higher reproduction quality.

In the above-mentioned video tape recorder, a plurality of reproducing heads are arranged; these reproducing heads are supported by an actuator in general composed of piezoelectric elements; and the reproducing heads are driven in the width direction of the video tracks of the magnetic tape by the actuator. Then, in a digital recording system for example, signals read from the reproducing heads are finally converted into binary signals of "1" and "0" as reproduced digital signals. Furthermore, DTF (dynamic track following) error signals indicative of offset rates of the heads from the video tracks, as pilot signals for later processing, are generated by a DTF error detector on the basis of the signals read from the heads. The generated DTF signals are given to the actuator driver to drive the piezoelectric elements in a direction such that the tracing offset can be eliminated. As described above, the head positions relative to the video tracks can be corrected to retain an optimum tracing operation.

In the prior art apparatus, however, there exists a problem in that jitter is easily generated. This is because the heads trace the video tracks in accordance with the DTF signals accompanied with a residual error determined by a servo system. The reason why the jitter is easily generated will be explained in more detail with reference to the attached drawings.

When two heads are used, the two heads trace two adjacent different tracks, individually. In FIG. 4, for instance, when the head 1a traces the track t2, the head 1b traces the tracks t1 and t3. Further, in general, an azimuth angle is previously determined between the two heads t1 and t2 in order to prevent cross talk between the adjacent tracks.

Therefore, as shown in FIG. 5, if the head 1a is located at the center of the track t2, the signal S matches the gap g. However, if the track is offset in the width direction of the track t2 as shown by a dashed line in FIG. 5, a time difference $\Delta \tau$ is generated. The relationship between the positional offset and the time difference $\Delta \tau$ is proportional as shown in FIG. 6. Accordingly, when the heads 1a and 1b trace the tracks along a zigzag line due to the servo control operation, as shown in FIG. 7, the reproduced signals are phase modulated on the basis of the frequency components of the zigzag motion, thus resulting in jitter. The above-mentioned jitter deteriorates the picture quality in the case of the analog recording video tape recorder, and the data error rate in the case of the digital recording video tape recorder.

Further, the above-mentioned residual error determined by the servo system is prominent in particular when a wobbling technique is adopted. In this wobbling technique, the heads are oscillated forcibly at a predetermined period to generate the pilot signals of large amplitude for improvement of error detection precision. Although being effective in the normal conditions, this wobbling technique emphasizes the above-mentioned jitter, because the magnetic heads are further oscillated forcibly along a zigzag line and therefore the residual error increases.

In summary, in the prior art dynamic tracking reproduction apparatus, there exists a problem in that the time axis of the reproducing signals fluctuate due to the zigzag motion of the heads on the tracks, thus it being impossible to generate reliable reproducing signals.

SUMMARY OF THE INVENTION

With these problems in mind, therefore, it is an object of the present invention to provide a dynamic tracking reproduction apparatus which can generate reproducing signals free from the time axis fluctuations due to the zigzag motion of the heads relative to the tracks.

According to the present invention, there is provided a dynamic tracking reproduction apparatus comprising: an actuator for driving a magnetic head in a width direction of recording tracks formed on a recording and reproducing tape; error detecting means for detecting offsets of the magnetic head from a reference position in the width direction of the recording tracks as positional error signals on basis of signals read from the magnetic head; actuator driving means for driving said actuator so that the magnetic head is directed to the reference position on the basis of the detected error signals; and delay means for correcting time axis of the read signals so that the magnetic head can be located on the reference position on the basis of the detected error signals.

In an embodiment of the present invention, actuators are driving by the detected error signal to which a dither signal is added.

According to the present invention, it is possible to generate reliable reproducing signals free from the time axis fluctuations by cancelling the time axis fluctuations generated during dynamic tracking operation with delay means.

DETAILED DESCRIPTION OF THE PREFERRED EMBODIMENTS

Embodiments of dynamic tracking reproduction apparatus of the present invention will be described hereinbelow with reference to the attached drawings.

Figure 1:
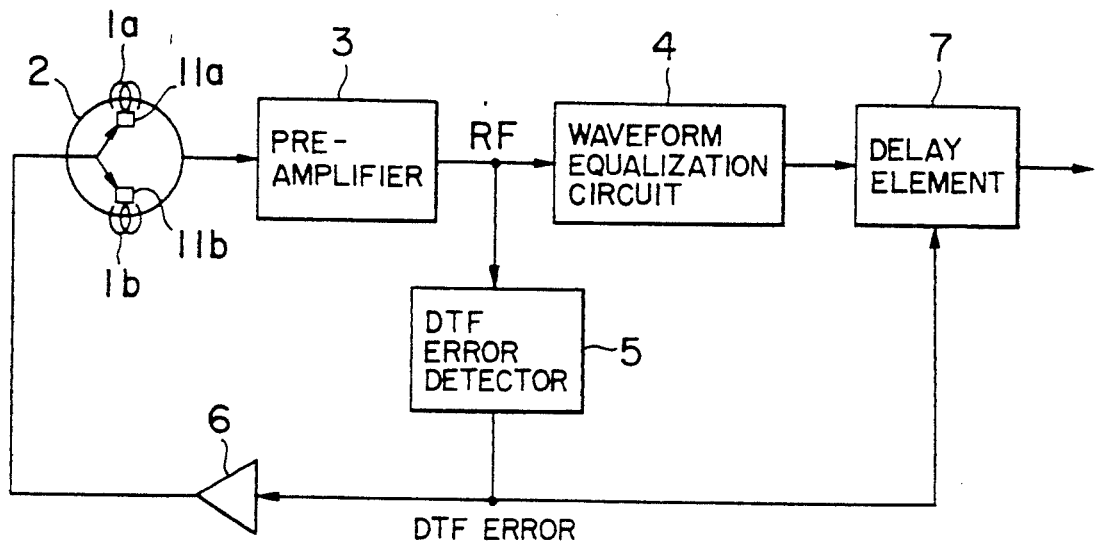
FIG. 1 is a block diagram showing an embodiment of the dynamic tracking reproduction apparatus according to the present invention.

FIG. 1 shows a configuration of an embodiment of the present invention, which is applied to a digital video tape recorder. In the drawing, two reproducing heads 1a and 1b are disposed 180 degree angular distance apart from each other within a cylinder 2 rotating at a high speed. The heads 1a and 1b are supported by actuators 11a and 11b composed of piezoelectric elements, respectively. These actuators are driven in the width direction of the video tracks of the magnetic tape.

Signals read by these reproducing heads 1a and 1b are amplified to RF signals through a preamplifier 3, and then converted into binary signals of "1" and "0" through a waveform equalizer 4, as reproduced digital signals.

Further, the RF signals amplified by the preamplifier 3 is given to a DTF (dynamic track following) error detector 5. The DTF detector 5 envelope-detects the received RF signals to generate DTF error signals as pilot signals. As previously described, the DTF signals represent the offset rates of the reproducing heads 1a and 1b from the video tracks. The error detection signals are given to an actuator driver 6 to drive the piezoelectric elements in the direction that the offset of the heads from the tracks are eliminated. The output signals of the waveform equalizer 4 and the DTF error detector 5 are both inputted to a delay element 7. This delay element 7 delays the digital video signals from the waveform equalizer 4 according to the DTF error detection signals to correct the time axis of the reproducing signals to be outputted.

Figure 3A:
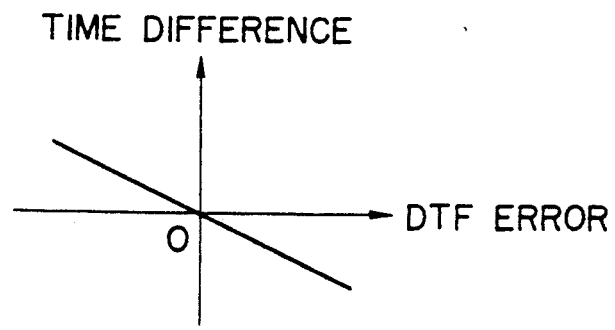
FIGS. 3A, 3B and 3C are graphical representations for assistance in explaining the principle of the time axis correction by the delay elements shown in FIGS. 1 and 2.
Figure 3B:
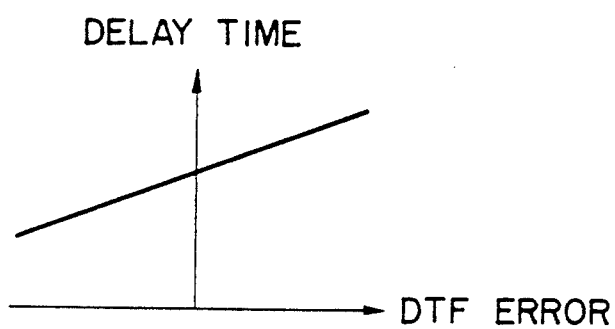
Figure 3C:
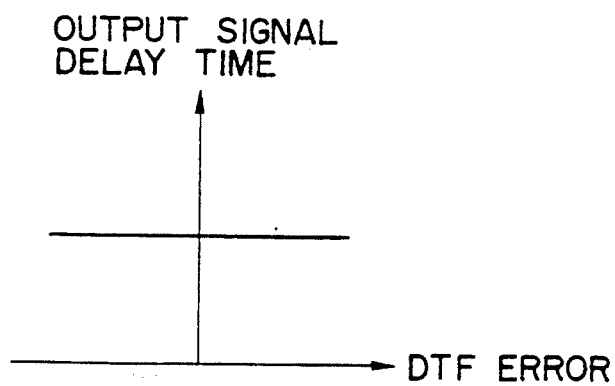
Figure 4:
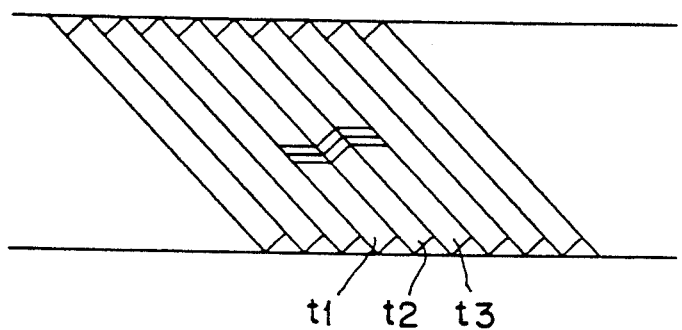
FIG. 4 is an illustration for assistance in explaining the recording track structure formed on a tape using the technique of helical scanning of the video tape recorder head.
Figure 5:
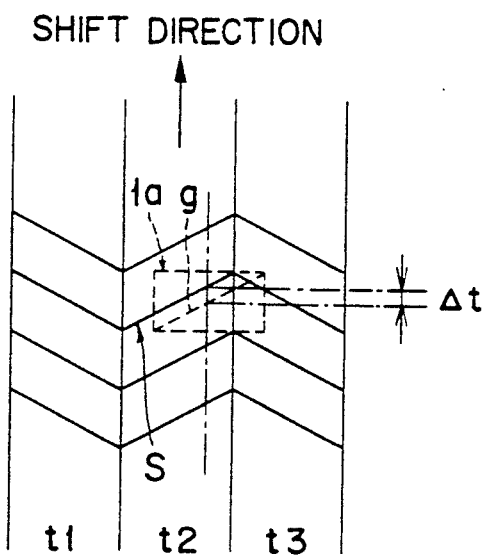
FIG. 5 is an illustration for assistance in explaining the principle of reproduction time difference generated due to tracing offset.
Figure 6:
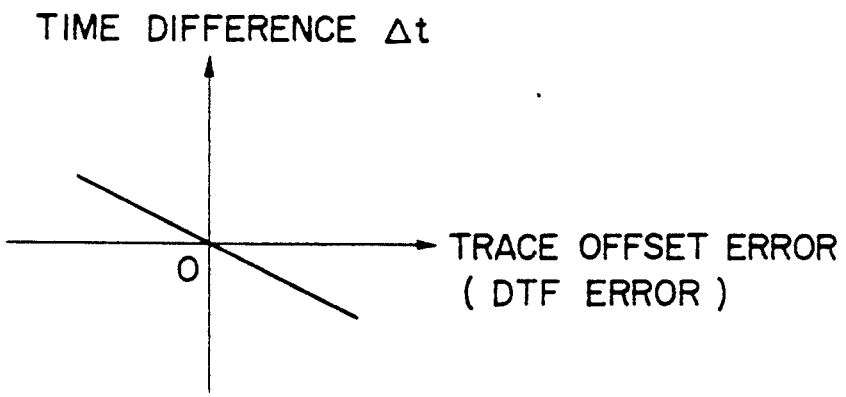
FIG. 6 is a graphical representation showing the relationship between the tracing offset and the time difference.

With reference to FIGS. 3A–3C, the operation of the apparatus of the present invention will be described. FIG. 3A shows the relationship between the time difference $\Delta\tau$ and the DTF error. FIG. 3B shows the relationship between the delay time by the delay element 7 and the DTF error. Since the characteristics shown in FIG. 3A is opposite to those shown in FIG. 3B, the time axis fluctuations of the output signals of the waveform equalizer 4 can be cancelled by the characteristics of the delay element 7, with the result that it is possible to output reproducing signals having no time axis fluctuations (which are free from the DTF error) from the delay element 7, as depicted in FIG. 3C. In other words, since reliable reproducing signals having no time axis fluctuations can be obtained, it is possible to prevent the error rate caused by the dynamic tracking control from being increased.

Figure 2:
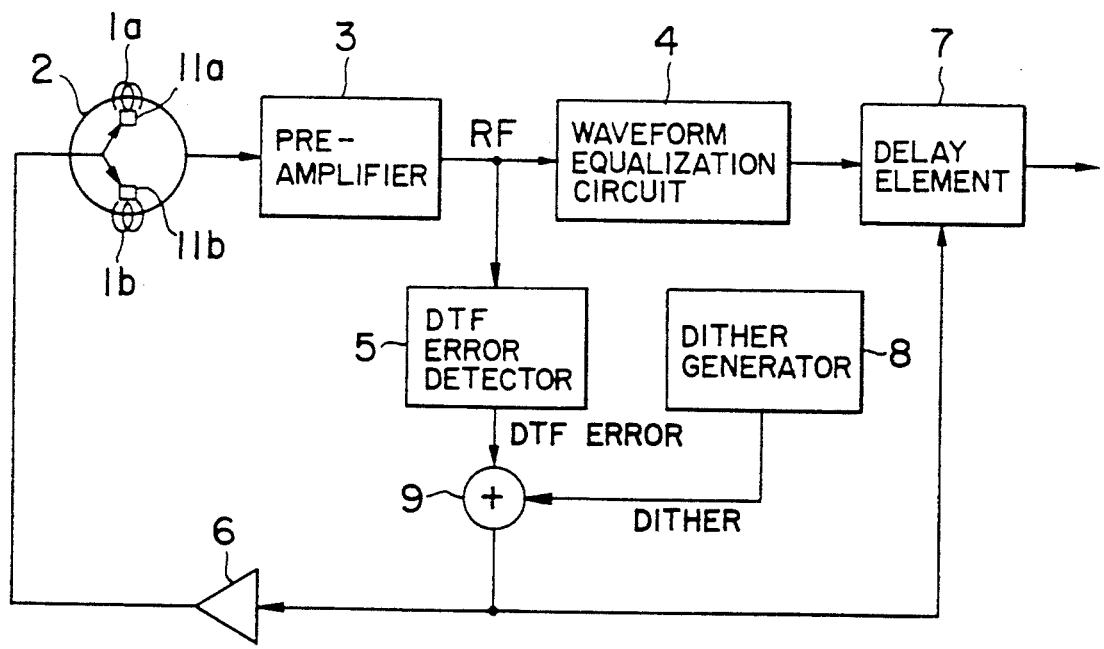
FIG. 2 is a block diagram showing another embodiment of the dynamic tracking reproduction apparatus according to the present invention.

FIG. 2 shows a configuration of another embodiment of dynamic tracking reproduction apparatus related to the present invention, to which the wobbling technique is adopted.

In this embodiment, a dither generator 8 and an adder 9 are additionally incorporated in the configuration shown in FIG. 1.

Figure 7:
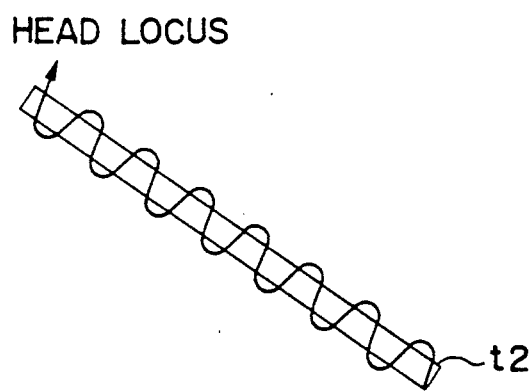
FIG. 7 is an illustration for assistance in explaining the zigzag motion of the head on the recording track.

Such dither generator is known by Japanese Patent Laid Open No. 52-117603. Dither signals which are periodically or randomly variating signal component from the dither generator 8 are added to the error detection signals from the DTF error detector 5 by the adder 9, and then applied to the actuator driver 6. The actuator 6 drives the piezoelectric elements for supporting the heads 1a and 1b on the basis of the added signals. Therefore, the heads 1a and 1b may be oscillated greatly as shown in FIG. 7 in the case where no delay element is incorporated, so that there exists a problem in that a large jitter may be produced. In the present embodiment, however, since the output signals of the adder 9 are applied to the delay element 7 as control signals, the time axis of the output signals from the waveform equalizer 4 are correct without oscillating the heads 1a and 1b, thus it being possible to obtain reliable reproducing signals free from time axis fluctuations.

The embodiments of the present invention have been explained by taking the case of the digital video tape recorder, by way of example. Without being limited thereto, however, present invention can be of course applied to analog video tape recorders for prevention of deterioration of picture quality. Further, the present invention can be also applied to digital audio tape recorder.

What is claimed is:

1. A dynamic tracking reproduction apparatus comprising:
   an actuator for driving a magnetic head in a width direction of recording tracks formed on a recording and reproducing tape;
   error detecting means for detecting an offset of the magnetic head from a reference position in the width direction of the recording tracks and for generating a positional error signal from signals read by the magnetic head;
   actuator driving means for driving said actuator so that the magnetic head is directed to the reference position in response to said positional error signal; and
   delay means for correcting a time axis of the read signals so that the magnetic head can be located on the reference position in response to said positional error signal.

2. A dynamic tracking reproduction apparatus comprising:
   an actuator for driving a magnetic head in a width direction of recording tracks formed on a recording and reproducing tape;
   error detecting means for detecting an offset of the magnetic head from a reference position in the width direction of the recording tracks and for generating a positional error signal from signals read by the magnetic head;
   dither generating means for generating a dither signal;
   adding means for obtaining a sum signal of the dither signal and te positional error signal;
   actuator driving means for driving said actuator so that the magnetic head is directed to the reference position in response to said sum signal; and
   delay means for correcting a time axis of the read signals so that the magnetic head can be located on the reference position in response to said sum signal.

* * * * *